US007997982B2

(12) United States Patent
Jubinville et al.

(10) Patent No.: US 7,997,982 B2
(45) Date of Patent: Aug. 16, 2011

(54) LOTTERY GAME HAVING AN INDEPENDENT RAFFLE PRIZE

(75) Inventors: Chantal Jubinville, Hoboken, NJ (US); Victor Marinelli, Cumming, GA (US)

(73) Assignee: Scientific Games International, Inc., Alpharetta, GA (US)

( * ) Notice: Subject to any disclaimer, the term of this patent is extended or adjusted under 35 U.S.C. 154(b) by 759 days.

(21) Appl. No.: 11/703,531

(22) Filed: Feb. 7, 2007

(65) Prior Publication Data

US 2007/0249418 A1 Oct. 25, 2007

Related U.S. Application Data

(60) Provisional application No. 60/765,916, filed on Feb. 7, 2006.

(51) Int. Cl.
*A63F 13/00* (2006.01)

(52) U.S. Cl. .......................................................... 463/27

(58) Field of Classification Search .............. 463/16–20, 463/22, 25–27

See application file for complete search history.

(56) References Cited

U.S. PATENT DOCUMENTS 4,842,278 A 6/1989 Markowicz
5,129,652 A 7/1992 Wilkinson
5,158,293 A 10/1992 Mullins
5,472,196 A 12/1995 Rusnak
7,213,811 B2 5/2007 Bozeman
2003/0104853 A1 6/2003 Tessmer et al.
2004/0063482 A1* 4/2004 Toyoda .......................... 463/11
2005/0096130 A1* 5/2005 Mullins .......................... 463/27
2006/0178194 A1* 8/2006 Jubinville et al. ............... 463/17
2006/0217181 A1 9/2006 Jubinville et al.
2006/0253324 A1* 11/2006 Miller ............................ 705/14
2007/0259709 A1* 11/2007 Kelly et al. .................... 463/20

FOREIGN PATENT DOCUMENTS

WO WO 2006/086565 A2 8/2006

OTHER PUBLICATIONS

Co-Pending U.S. Appl. No. 12/240,135, filed Sep. 28, 2008.
PCT International Search Report and Written Opinion, Sep. 17, 2008.

* cited by examiner

*Primary Examiner* — David L Lewis
*Assistant Examiner* — Eric M Thomas
(74) *Attorney, Agent, or Firm* — Dority & Manning, P.A.

(57) ABSTRACT

A lottery game with a capped jackpot prize and increasing raffle prize is provided. The lottery game is set with an initial jackpot prize. If there is no jackpot winner for the lottery game for a drawing, the jackpot is increased until the jackpot is at least equal to a predefined value. For each subsequent drawing, a raffle prize is set and a raffle number is printed on each lottery ticket. The raffle prize is not distributed until a jackpot winner is determined.

10 Claims, 7 Drawing Sheets

200

| MATCHES | 1/PROBABILITY | PRIZE |
|---|---|---|
| 6 | 22,957,480.0 | JACKPOT |
| 5 | 81,409.5 | $5,000 |
| 4 | 1,415.8 | $200 |
| 3 | 70.8 | $10 |
| 2 | 8.6 | $2 |

Staring jackpot: $2,5000,000
Overall probability: 1 in 7.6
All-inclusive return: 66.6%

FIG. 2

300

| Drawing | Advertised Jackpot | Additional 1 Million Dollar Raffle Prizes |
|---|---|---|
| 1 | $2,500,000 | --- |
| 2 | $3,500,000 | --- |
| 3 | $4,500,000 | --- |
| 4 | $5,000,000 | 1 |
| 5 | $5,000,000 | 2 |
| 6 | $5,000,000 | 4 |
| 7 | $5,000,000 | 5 |
| 8 | $5,000,000 | 7 |
| 9 | $5,000,000 | 8 |
| 10 | $5,000,000 | 10 |
| 11 | $5,000,000 | 11 |
| 12 | $5,000,000 | 13 |
| 13 | $5,000,000 | 14 |
| 14 | $5,000,000 | 16 |
| 15 | $5,000,000 | 17 |
| 16 | $5,000,000 | 19 |
| 17 | $5,000,000 | 20 |
| 18 | $5,000,000 | 22 |
| 19 | $5,000,000 | 23 |
| 20 | $5,000,000 | 25 |

FIG. 3

400

| MATCHES | 1/PROBABILITY | PRIZE |
|---|---|---|
| 6 | 50,063,860.0 | JACKPOT |
| 5 | 154,518.1 | $5,000 |
| 4 | 2,332.3 | $200 |
| 3 | 100.9 | $10 |
| 2 | 10.6 | $2 |

Staring jackpot: $5,0000,000
Overall probability: 1 in 9.5
All-inclusive return: 55.2%

FIG. 4

500

| Drawing | Advertised Jackpot | Additional 1 Million Dollar Raffle Prizes |
|---|---|---|
| 1 | $5,000,000 | --- |
| 2 | $8,000,000 | --- |
| 3 | $11,000,000 | --- |
| 4 | $14,574,000 | --- |
| 5 | $18,217,500 | --- |
| 6 | $20,000,000 | 1 |
| 7 | $20,000,000 | 5 |
| 8 | $20,000,000 | 9 |
| 9 | $20,000,000 | 12 |
| 10 | $20,000,000 | 16 |
| 11 | $20,000,000 | 20 |
| 12 | $20,000,000 | 23 |
| 13 | $20,000,000 | 27 |
| 14 | $20,000,000 | 31 |
| 15 | $20,000,000 | 34 |
| 16 | $20,000,000 | 38 |
| 17 | $20,000,000 | 41 |
| 18 | $20,000,000 | 45 |
| 19 | $20,000,000 | 49 |
| 20 | $20,000,000 | 52 |

FIG. 5

LOTTERY GAME HAVING AN INDEPENDENT RAFFLE PRIZE

CROSS-REFERENCE TO RELATED APPLICATION

This application claims the benefit to the U.S. Provisional Patent Application No. 60/765,916, "Lottery Game," filed on Feb. 7, 2006, the specification of which is incorporated herein in its entirety by this reference.

BACKGROUND OF THE INVENTION

1. Field of the invention

The present invention relates to lottery games and more specifically to a lottery game a capped jackpot and a growing raffle prize.

2. Description of the Related Art

Lottery games that draw fixed numbers from a set of numbers are well-known, with one example the common game of "FANTASY 5," in which a player chooses five (5) numbers from 1 to 39. If the five numbers chosen by the player match the five numbers selected by the lottery authority, the player wins the jackpot. If there is no winner, the jackpot is rolled over and added to the prize for the next drawing. Prizes will also be awarded to partial matches.

It may take several drawings until someone matches all the numbers and wins the jackpot. When the jackpot is small and no one wins for several weeks, the public may lose interest on the game. Therefore, it is desirable to have a lottery game that consistently attracts player's attention, even though the ultimate jackpot may not be very large, and it is to such a lottery game the present invention is primarily directed.

SUMMARY OF THE INVENTION

In one embodiment, there is provided a method for hosting a lottery game with a jackpot prize and an incrementing raffle prize. In one embodiment, the method includes the steps of a) setting the jackpot prize, b) generating a set of winning indicia, c) determining if there is a jackpot prize winner, d) if there is no jackpot prize winner and the jackpot prize is not at least equal to a predefined value, then incrementing the jackpot prize, e) if there is no jackpot prize winner and the jackpot prize is at least equal to a predefined value, then setting a raffle prize if there was no raffle prize, and f) if there is no jackpot prize winner and there is a raffle prize, then incrementing the raffle prize.

In an alternative embodiment, there is provided a method for hosting a lottery game with a jackpot and an incrementing raffle prize. The method includes the steps of a) receiving a set of player indicia from at least one player, b) determining if the jackpot prize being at least equal to a predefined value, c) if the jackpot prize being at least equal to the predefined value, then generating a raffle number, and d) issuing a lottery ticket with the set of player indicia and the raffle number.

In another alternative embodiment, there is provided a gaming server for hosting a lottery game with a jackpot prize and an incrementing raffle prize. The gaming server includes a game input device for receiving a plurality of game entries, a storage unit for storing a prize table and a plurality of game entries, and a controller. Each game entry has at least one set of player indicia and each controller is capable of a) setting the jackpot prize, b) generating a set of winning indicia, c) determining if there is a jackpot prize winner, d) if there is no jackpot prize winner and the jackpot prize is not at least equal to a predefined value, then incrementing the jackpot prize, e) if there is no jackpot prize winner and the jackpot prize is at least equal to a predefined value, then setting a raffle prize if there was no raffle prize, and f) if there is no jackpot prize winner and there is a raffle prize, then incrementing the raffle prize.

Other advantages and features of the present invention will become apparent after review of the hereinafter set forth Description of the Drawings, Detailed Description of the Invention, and the Claims.

DESCRIPTION OF THE DRAWINGS

FIG. 2 is an exemplary prize table with a corresponding probability table according to one embodiment of the invention.

FIG. 3 is an exemplary jackpot and raffle prize table according to one embodiment of the invention.

FIG. 4 is an exemplary prize table with a corresponding probability table according to an alternative embodiment of the invention.

FIG. 5 is an exemplary jackpot and raffle prize table according to an alternative embodiment of the invention.

DETAILED DESCRIPTION OF THE INVENTION

Briefly described the present application discloses a lottery game with a growing, but capped, jackpot prize and an incrementing raffle prize that is awarded at the same time, but independently from the jackpot prize. In one embodiment the game, the invention is a number-matching lottery game, for example, one in which a player chooses 6 numbers from 1 to 53. If the numbers chosen by the player match all six numbers chosen by the lottery authority, then the player wins the jackpot prize. If there is more than one winner, then the jackpot is shared among the winners. If there is not a winner, the jackpot prize is rolled over and added to the winning of the next drawing. Winnings for partial matching may be awarded after each drawing. The jackpot prize will continue to grow until it hits a predefined "ceiling," when it will no longer be increased. The jackpot prize will be capped at the predefined value. This number-matching game is referred to herein as the "base game."

If there is no jackpot winner after the jackpot prize is capped, the tickets for subsequent drawings will be issued with a raffle number and a separate raffle prize will be established. The raffle prize is independent from the jackpot prize and the raffle game's winner is determined independently from the base game. The raffle prize will not be distributed to the raffle winners until a jackpot winner is determined. There may or may not be a raffle winner for each base game drawing. For example, if the raffle game entries are restricted to only the raffle numbers issued for a particular base game drawing, then one raffle winner is determined with each drawing. On the other hand, if the raffle game entries are a fixed number of entries regardless whether all the raffle numbers have been issued, then there may be no raffle winner if the raffle number selected has not been issued to any lottery game ticket. Each raffle entry is only good for one single raffle drawing.

Figure 1:
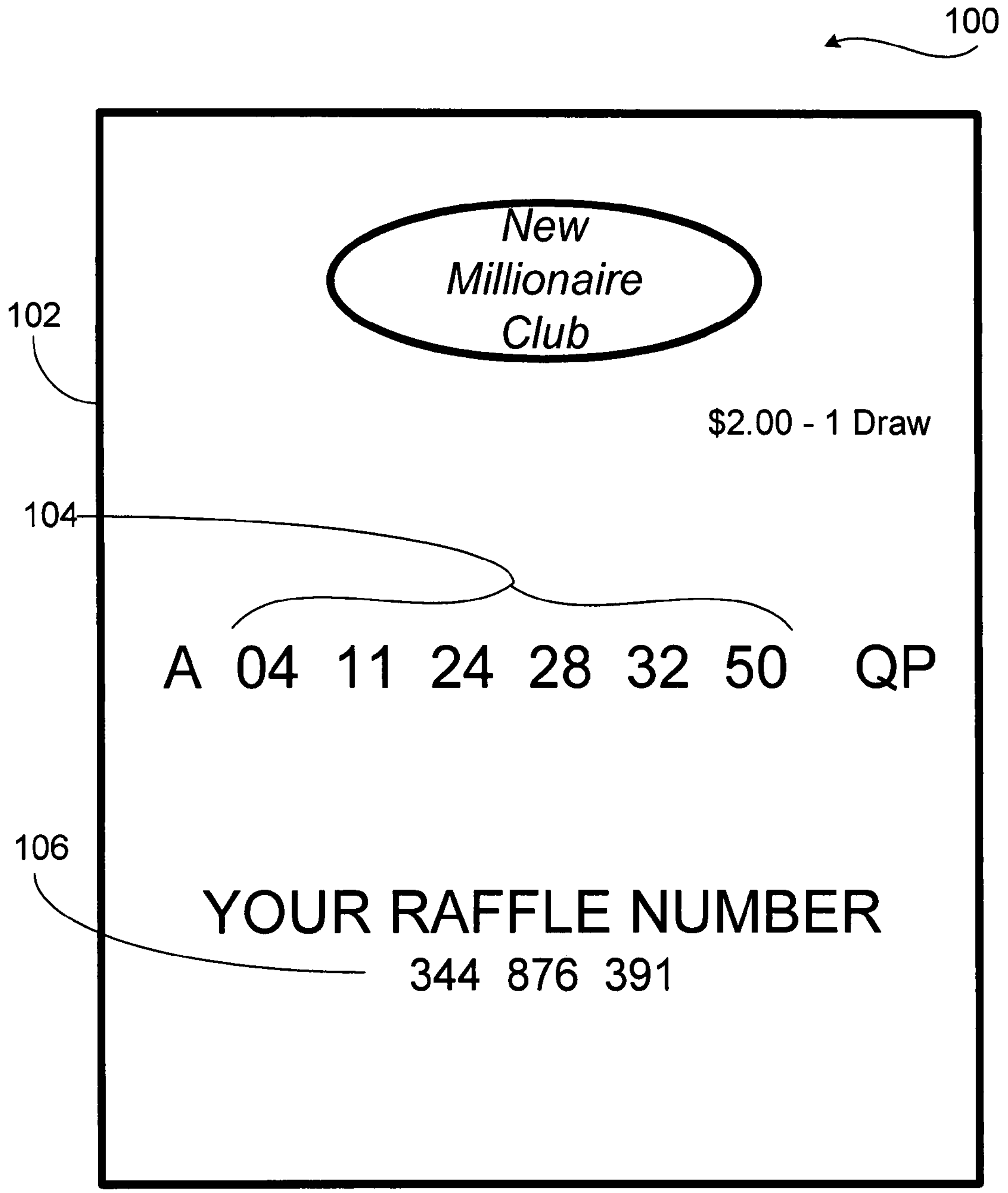
FIG. 1 is an exemplary playslip of one embodiment of the game of the present invention.

An exemplary playslip 102 is illustrated in FIG. 1. The playslip 102 includes one or more set of player indicia 104 that can be picked by the player or generated automatically by a random number generator through a "quick-pick" (QP) selection. In this example, the playslip has numbers 04, 11, 24, 28, 32, and 50 chosen through a quick-pick process. If the playslip is issued after the jackpot prize is capped (no jackpot winner so far), then the playslip includes a raffle number 106. The raffle number 106 may be sequential and automatically generated by the lottery authority.

FIG. 2 depicts an exemplary prize table 200 with corresponding probabilities for a lottery game in which a player chooses 6 numbers from 1 to 53. As it is shown, a player will be entitled to $2 if he matches two numbers and entitled to the jackpot if he matches all 6 numbers. FIG. 3 depicts a prize table 300 listing the growth of the jackpot and the growth of the raffle prize. As it can be seen, the jackpot starts at $2,500,000 and is capped at $5,000,000. The raffle prize is initially not available until the jackpot prize is capped. The raffle prize starts at $1,000,000 and increases with each drawing when there is no jackpot winner. The prize table 300 shows the progression of the jackpot and raffle prizes. An average run for a jackpot prize is 12 drawings and the overall probability is 1 in 7.6 and all-inclusive return of 66.6%.

FIG. 4 illustrates an alternative exemplary prize table 400 with corresponding probabilities for a lottery game in which a player chooses 6 numbers from 1 to 60. As it is shown, a player will have a chance of 1/10.6 to match 2 numbers and win $2. FIG. 5 depicts a prize table 500 listing the growth of the jackpot and the growth of the raffle prize. As it can be seen, the jackpot starts at $5,000,000 and is capped at $20,000,000. The raffle prize is initially not available until the jackpot prize is capped. The raffle prize starts at $1,000,000 and increases with each drawing when there is no jackpot winner. The prize table 500 shows the progression of the jackpot and raffle prizes. An average run for a jackpot prize is 10 drawings and the overall probability is 1 in 9.5, and all-inclusive return of 55.2%.

Figure 6:
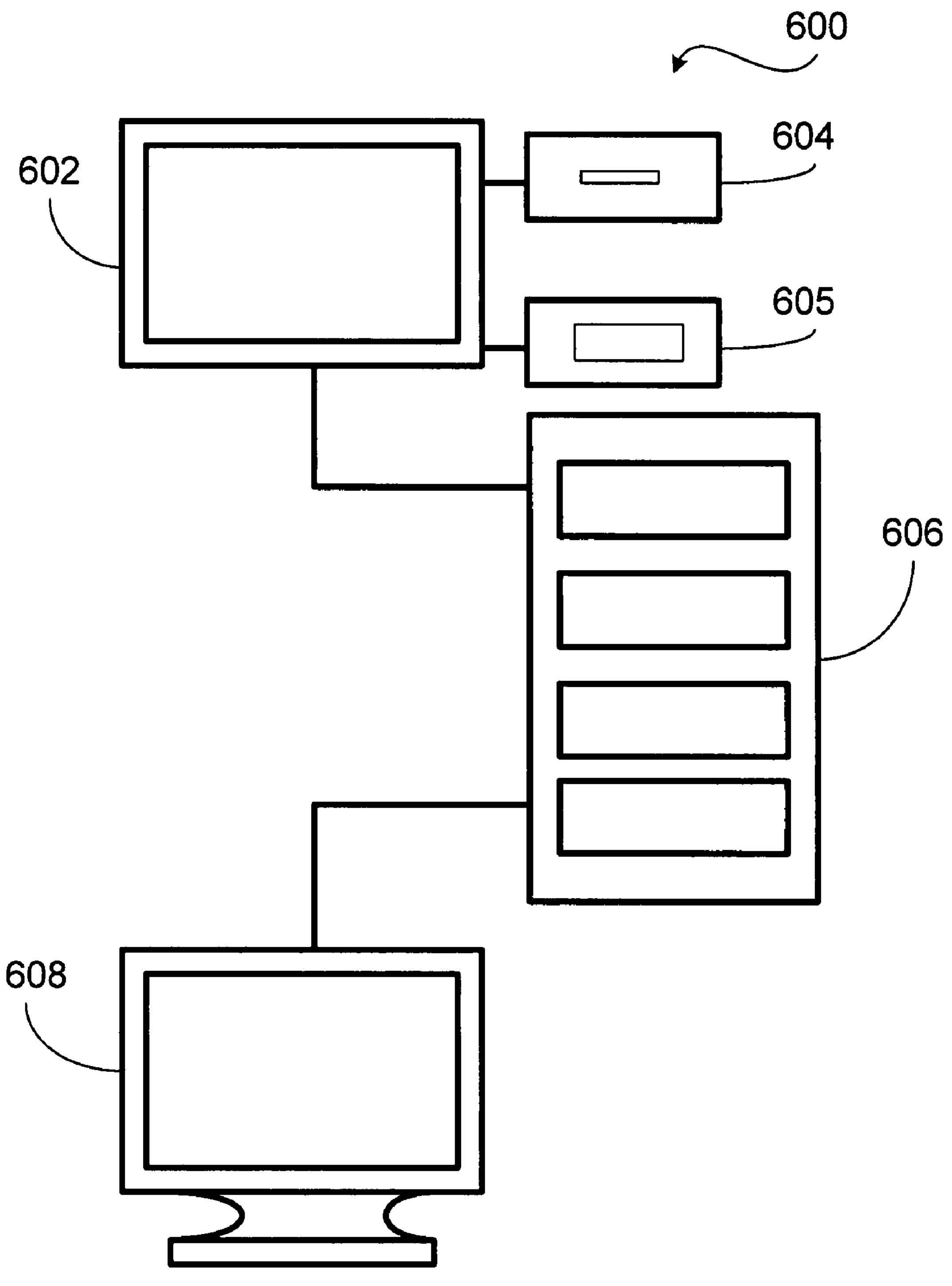
FIG. 6 depicts a system supporting the lottery game of the present invention.

FIG. 6 illustrates a system 600 according to the invention. The game of the invention can be played through a display device 602. The display device 602 may be a touch screen device capable of receiving user selection. Alternatively, the display device 602 may also be equipped with a game input device (not shown) such as keyboard or game device through which a player may enter his selection. The display device 602 may also be equipped with a scanning input device capable of receiving the user selection recorded in a play slip. The display device 602 may be equipped with a device 604 that takes wager from the player. The wager may be in form of credit card or cash. The display device 602 may further be attached to a lottery ticket-dispensing machine 605. The lottery ticket-dispensing machine may be a printer or other type of device capable of dispensing lottery tickets with a player's selection and a raffle number. The display device 602 is connected to a game server 606. The server 606 includes a controller that is capable of generating winning numbers for the lottery authority and determining the number of matches between the game symbols and player symbols. The controller is also capable of generating raffle numbers for each entry after the jackpot prize reaches a predefined limit. The server 606 may also includes a storage unit for storing game entries received from the players. Alternatively, the game may be played through a remote terminal 608 connected to the server 606. In this example, the remote terminal 608 may be a computing device located in a casino and may also be a computing device located in a player's home, or other location.

Figure 7:
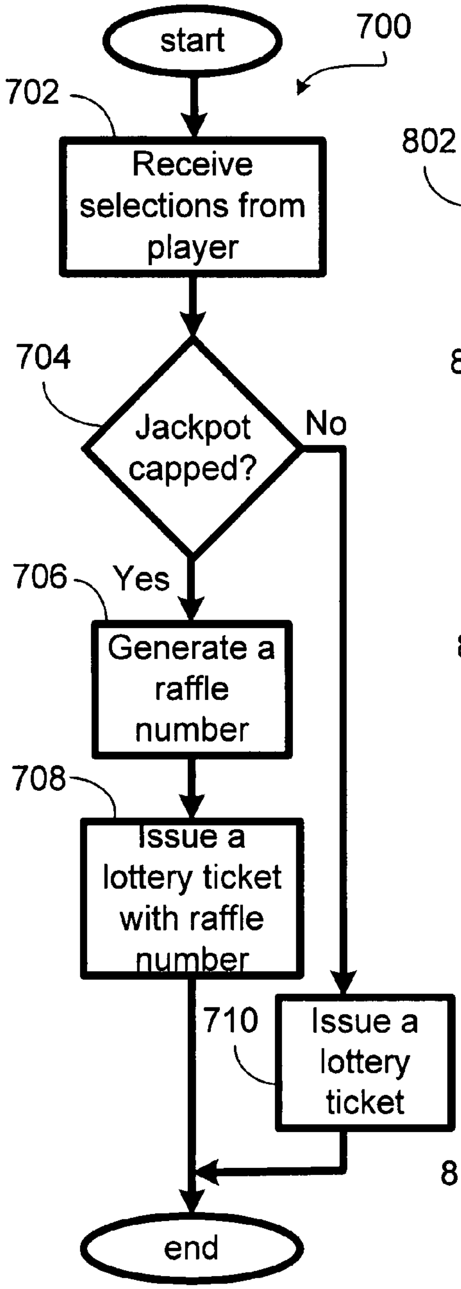
FIG. 7 depicts a lottery game player process according to one embodiment of the invention.

FIG. 7 illustrates a player process 700 according to one embodiment of the invention. The player buys a lottery game ticket and chooses his numbers through a playslip at a lottery game station. The player's numbers are received by a lottery game station, step 702, and the lottery game station will check if the jackpot prize has reached its predefined cap value, step 704. If the jackpot prize has not reached the cap value, then the lottery game station generates a lottery ticket with numbers selected by the player, step 710. If the jackpot prize is capped, then the lottery game station generates a raffle number, step 706, and issues a lottery ticket with the numbers selected by the player and the raffle number, step 708. Alternatively, the raffle number may also be generated by and received from the lottery authority's central server.

Figure 8:
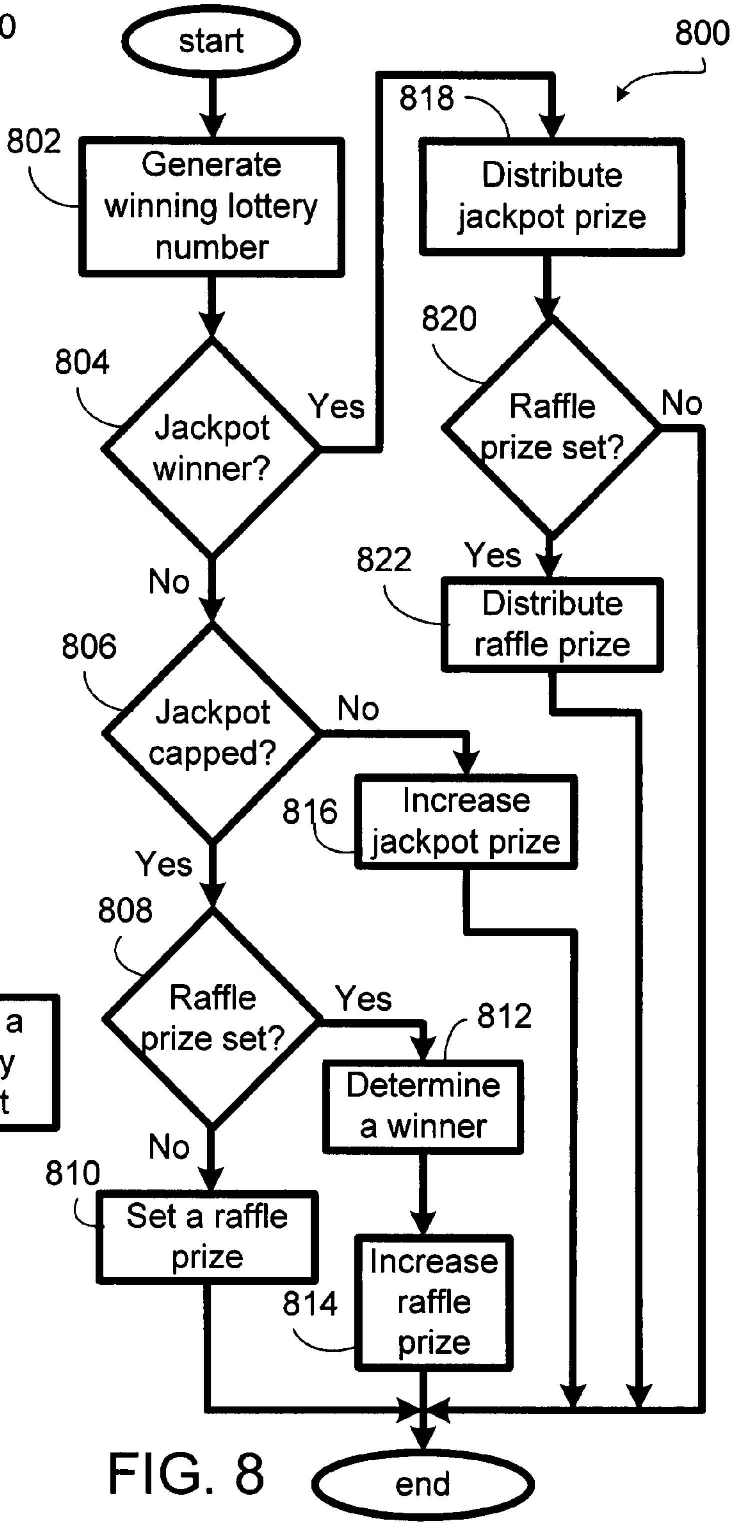
FIG. 8 depicts a lottery game server process according to one embodiment of the invention.

FIG. 8 depicts a lottery game server process 800 according to one embodiment of the invention. Periodically the lottery authority generates winning numbers for the lottery game, step 802, and checks whether there is a winner for the lottery game, step 804. If there is no winner, then it is determined as to whether the jackpot prize has reached the cap value, step 806. If the jackpot prize has reached the capped value, then it is checked if a raffle prize is established, step 808. If not, then a raffle prize is established, step 810; if a raffle prize is established, then, a raffle winner is determined, step 812 and the raffle prize is increased, step 814. If the jackpot prize is not capped, then the jackpot prize is increased, step 816. If there is one or more jackpot prize winners, then the jackpot prize is distributed among the jackpot prize winners, step 818, and it is also determined as to whether there is a raffle prize, step 820. If there is a raffle prize, then the raffle prize is distributed among the raffle prize winners, step 822.

Although preferred embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. Moreover, although specific terms are employed herein, they are used in a generic and descriptive sense only, and not for the purposes of limiting the described invention.

What is claimed is:

1. A method for hosting a base lottery game with a jackpot prize and an associated raffle game with an incrementing raffle prize, comprising the steps of:

a) setting the initial jackpot prize and a cap for the jackpot prize in the base lottery game;

b) generating a set of winning indicia for the base lottery game;

c) determining if there is a jackpot prize winner in the base lottery game;

d) if there is no jackpot prize winner and the jackpot prize is not at the cap amount, then incrementing the jackpot prize;

e) if there is no jackpot prize winner and the jackpot prize is at the cap amount, then establishing a raffle prize in the raffle game if there was no raffle prize previously established and generating raffle game indicia for players in subsequent plays of the base lottery game, wherein the raffle prize is a separate prize from the jackpot prize;

f) if there is no jackpot prize winner and there is a raffle prize, then incrementing the raffle prize and holding the jackpot prize at the cap amount for subsequent plays of the base lottery game; and g) if there is a jackpot prize winner in the base lottery game and there is a raffle prize, distributing the jackpot prize to the winner in the base lottery game and distributing the raffle prize to the winner in the raffle game such that the raffle prize is only awarded if there is a jackpot prize winner in the base lottery game and is only awarded to a player in the base lottery game.

2. The method of claim 1, further comprising incrementing the raffle prize by a predefined amount for subsequent plays of the base lottery game if there is no jackpot prize winner.

3. The method of claim 1, wherein the step of distributing the raffle prize to the winner in the raffle game further comprises dividing the raffle prize among raffle winners if there are at least two raffle prize winners.

4. The method of claim 1, wherein the step of determining if there is a jackpot prize winner further comprises comparing at least one set of player indicia with the set of winning indicia.

5. The method of claim 1, wherein the step of generating raffle game indicia for players in subsequent plays of the base lottery game comprises generating a raffle number; and issuing a lottery ticket for play of the base lottery game with the set of player indicia and the raffle number.

6. The method of claim 5, wherein if the jackpot prize is less than the cap amount, then issuing a lottery ticket without the raffle number in a subsequent play of the base lottery game.

7. A gaming server for hosting a base lottery game with a jackpot prize and an incrementing raffle prize, the gaming server comprising:

a game input device for receiving a plurality of game entries, each game entry having at least one set of player indicia;

a storage unit for storing a prize table and a plurality of game entries; and a controller being capable of a) setting the initial jackpot prize and a cap for the jackpot prize in the base lottery game;

b) generating a set of winning indicia for the base lottery game;

c) determining if there is a jackpot prize winner in the base lottery game;

d) if there is no jackpot prize winner and the jackpot prize is not at the cap amount, then incrementing the jackpot prize;

e) if there is no jackpot prize winner and the jackpot prize is at the cap amount, then establishing a raffle prize in a raffle game if there was no raffle prize previously established and generating raffle game indicia for players in subsequent plays of the base lottery game, wherein the raffle prize is a separate prize from the jackpot prize;

f) if there is no jackpot prize winner and there is a raffle prize, then incrementing the raffle prize and holding the jackpot prize at the cap amount for subsequent plays of the base lottery game; and g) if there is a jackpot prize winner in the base lottery game and there is a raffle prize, distributing the jackpot prize to the winner in the base lottery game and distributing the raffle prize to the winner in the raffle game such that the raffle prize is only awarded if there is a jackpot prize winner in the base lottery game and is only awarded to a player in the base lottery game.

8. The gaming server of claim 7, wherein the controller further being capable of: incrementing the raffle prize by a predefined amount for subsequent plays of the base lottery game if there is no jackpot prize winner.

9. The gaming server of claim 7, wherein the controller further being capable of dividing the raffle prize among raffle winners if there are at least two raffle prize winners.

10. A gaming server for hosting a lottery game with a jackpot prize and an incrementing raffle prize, the gaming server comprising:

means for receiving a plurality of game entries, each game entry having at least one set of player indicia;

means for storing a prize table and a plurality of game entries; and controlling means being capable of a) setting the initial jackpot prize and a cap for the jackpot prize in the base lottery game;

b) generating a set of winning indicia for the base lottery game;

c) determining if there is a jackpot prize winner in the base lottery game;

d) if there is no jackpot prize winner and the jackpot prize is not at the cap amount, then incrementing the jackpot prize;

e) if there is no jackpot prize winner and the jackpot prize is at the cap amount, then establishing a raffle prize in a raffle game if there was no raffle prize previously established and generating raffle game indicia for players in subsequent plays of the base lottery game, wherein the raffle prize is a separate prize from the jackpot prize;

f) if there is no jackpot prize winner and there is a raffle prize, then incrementing the raffle prize and holding the jackpot prize at the cap amount for subsequent plays of the base lottery game; and g) if there is a jackpot prize winner in the base lottery game and there is a raffle prize, distributing the jackpot prize to the winner in the base lottery game and distributing the raffle prize to the winner in the raffle game such that the raffle prize is only awarded if there is a jackpot prize winner in the base lottery game and is only awarded to a player in the base lottery game.

* * * * *